H. W. & R. LAFFERTY.
Machines for Corrugating Metallic Cylinders.
No. 154,685. Patented Sept. 1, 1874.
Fig: 1
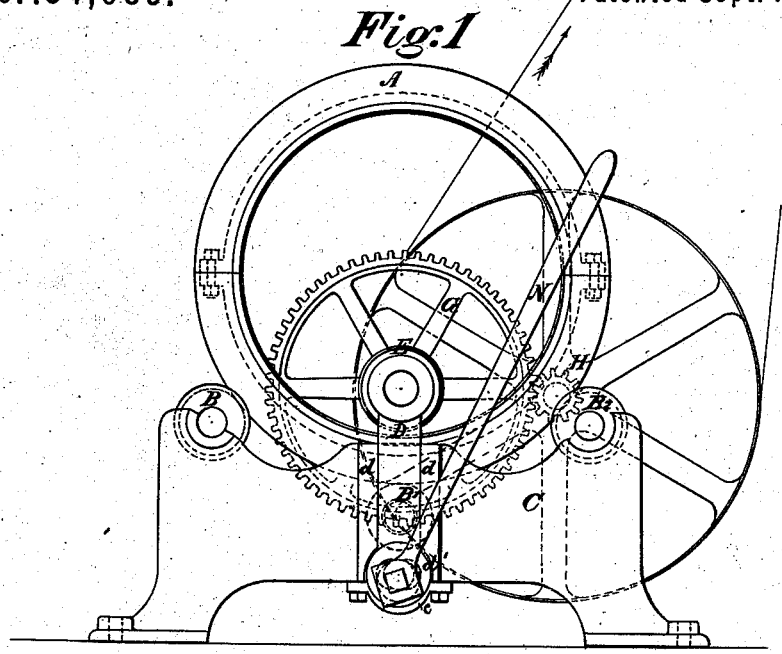
Fig: 2
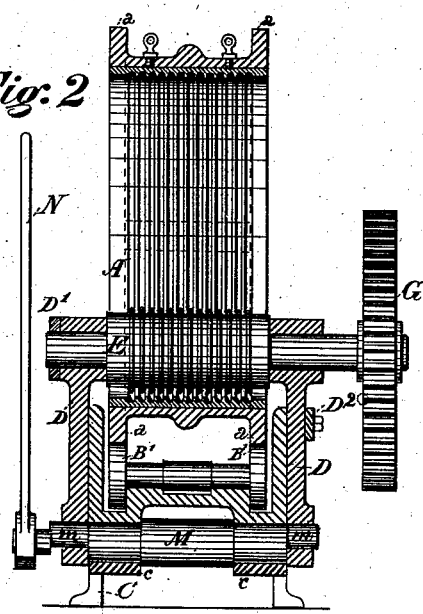
Fig: 3
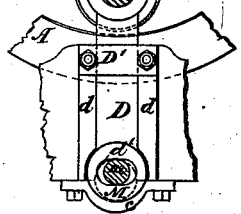
Witnesses:
Inventors:
Hugh W. Lafferty
Robert Lafferty
By Everding & Bell
Attys.

UNITED STATES PATENT OFFICE.

HUGH W. LAFFERTY AND ROBERT LAFFERTY, OF GLOUCESTER CITY, NEW JERSEY.

IMPROVEMENT IN MACHINES FOR CORRUGATING METALLIC CYLINDERS.

Specification forming part of Letters Patent No. 154,685, dated September 1, 1874; application filed March 3, 1874.

*To all whom it may concern:*

Be it known that we, HUGH W. LAFFERTY and ROBERT LAFFERTY, both of Gloucester City, in the county of Camden and State of New Jersey, have invented certain new and useful Improvements in Machines for Corrugating Metallic Cylinders, of which the following is a specification:

The object of our invention is to provide a simple and efficient machine for corrugating cylindrical vessels of sheet metal, so as to perfectly preserve their form and outline, and prevent appreciable reduction in the thickness of the material by stretching or expanding during the operation, to which end our invention consists in combining with a cylindrical form or mold, supported on friction-rollers and capable of rotation, a corrugated roller, revolving within and eccentrically to the form, the roller having a vertical movement imparted to it, as required, by means of an eccentric shaft and connecting-links, all as hereinafter more fully set forth.

In the accompanying drawings, Figure 1 is a view in elevation of a machine embodying our improvements; Fig. 2, a vertical central section of the same, taken at right angles to Fig. 1; and Fig. 3 a detached view, showing one of the links and parts adjacent thereto.

A cylindrical form, A, rests by its flanges $a$ $a$, and revolves upon friction-wheels B B$^1$ B$^2$, which are supported in suitable bearings or journals upon a bed-plate, C. The outer friction-wheels B B$^2$ are provided with flanges to prevent the deviation of the cylindrical form A from its normal plane of rotation, and their bearings are inclined toward the center of the form, the more effectually to resist the outward pressure thereof. On each side of the bed-plate, and central to the form A, is a link, D, movable in guides $d$. The upper ends of these links provide bearings for the journals of a steel roller, E, having a corrugated surface. The cylindrical form A is made in two parts, each being a semi-cylinder, provided with flanges for bolting the parts together. The inner surface of the form is lined with steel, and corrugated to correspond with the roller and with the thickness of the metallic cylinder that is intended to be corrugated. The lower ends of the links D are enlarged, and provided with oblong slots $d'$ $d'$, for the admission of the crank-pins $m$ $m$ on the shaft M. The shaft M has its bearings on the under side of the bed-plate, and is secured by caps $c$ $c$.

It will be seen that by turning the shaft M in its bearings the pins $m$ $m$ will move eccentrically to its axis, and impart a vertical movement to the links D D, which are compelled to move centrally by the guides $d$ $d$, and in order to allow the pins to turn the openings in the links D D are made in the form of longitudinal slots, as stated.

The steel roller E is rotated by means of a spur-wheel, G, permanently attached to it, and a corresponding pinion, H, on a counter-shaft. A pulley is attached to this counter-shaft, to which motion is communicated by means of a belt from a pulley on a line of shafting, or by any other suitable transmission from the prime mover.

A lever, N, secured upon the end of one of the pins $m$ $m$, which is made square for that purpose, is employed for turning the shaft M, and moving the links D D either up or down, as may be required.

We do not confine ourselves to the turning of the shaft M by means of an ordinary lever, as the same can be done in other ways—as, for instance, by means of a worm-wheel on the shaft M, and a corresponding worm on a rod secured to the bed-plate, and provided with a hand-wheel for the operator.

The operation of the machine is as follows: One half of the form A and the link D on the front of the machine are removed, this link being held by a removable collar, D$^1$, the other link by a strap, D$^2$, secured to the bed-plate. The metallic cylinder to be corrugated is inserted between the roller E and the lower half of the form A. The parts are then replaced, and motion is communicated to the roller E through the cog-wheel G. The operator then forces the roller E into contact with the metallic cylinder, by means of the lever N, which turns the shaft M. When the roller E comes in contact with the metallic cylinder the friction produced will cause the form A to rotate on the friction-wheels B B¹ B². This operation is continued, and the roller E brought gradually nearer the form A until the corrugations are perfect.

We do not limit ourselves to the precise details herein claimed, as the same may be varied without departing from the spirit of our invention.

We claim as new, and desire to secure by Letters Patent—

1. The combination, in a machine for corrugating metallic cylinders, of a cylindrical form, supported upon friction-wheels, and a corrugated roller revolving within the form, substantially as set forth.

2. The combination, in a machine for corrugating metallic cylinders, of links D D, a corrugated roller, E, crank-pins $m\ m$, and a shaft, M, substantially as set forth.

HUGH W. LAFFERTY.
ROBERT LAFFERTY.

Witnesses:
FRANCIS D. PASTORIUS,
JNO. EVERDING.